(12) United States Patent
Emmert et al.

(10) Patent No.: US 11,693,393 B2
(45) Date of Patent: Jul. 4, 2023

(54) BLOCKCHAIN METHOD FOR CONTROLLING AN INDUSTRIAL PROCESS

(71) Applicant: Schneider Electric Industries SAS, Rueil-Malmaison (FR)

(72) Inventors: Stefan Heinz Emmert, Wuerzburg (DE); Maximilian Eugen Stahl, Karbach (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 190 days.

(21) Appl. No.: 17/032,156

(22) Filed: Sep. 25, 2020

(65) Prior Publication Data

US 2021/0089011 A1 Mar. 25, 2021

(30) Foreign Application Priority Data

Sep. 25, 2019 (EP) .................................... 19199660

(51) Int. Cl.
*G05B 19/418* (2006.01)
*H04L 9/06* (2006.01)
*H04L 9/00* (2022.01)
*G06F 11/10* (2006.01)

(52) U.S. Cl.
CPC ... *G05B 19/41865* (2013.01); *G05B 19/4183* (2013.01); *G06F 11/1004* (2013.01); *H04L 9/0643* (2013.01); *H04L 9/50* (2022.05)

(58) Field of Classification Search
CPC .......... G05B 19/41865; G05B 19/4183; G05B 19/0425; G05B 19/4184; G05B 2219/25066; G05B 2219/25314; G05B 2219/25428; G05B 19/408; G05B 19/41845; G06F 11/1004; H04L 9/0643;
(Continued)

(56) References Cited

U.S. PATENT DOCUMENTS 4,309,569 A * 1/1982 Merkle ................. H04L 9/3247
713/180
10,860,259 B1 * 12/2020 Winarski ................ G06F 5/06
(Continued)

FOREIGN PATENT DOCUMENTS

CN 109164780 A 1/2019
CN 109213066 A 1/2019
(Continued)

OTHER PUBLICATIONS

European Search Report dated Mar. 31, 2020 in corresponding European Patent Application No. 19199660.2, 10 pages.

*Primary Examiner* — Mohammed Waliullah
(74) *Attorney, Agent, or Firm* — Oblon, McClelland, Maier & Neustadt, L.L.P.

(57) ABSTRACT

The invention relates to an industrial process controller comprising at least three field devices coupled to one another by means of a data link, with the field devices controlling and/or monitoring an industrial process, wherein the field devices are configured to store a block chain, wherein the block chain comprises a plurality of blocks, and wherein the blocks store use data. The process controller is characterized in that the field devices are configured to delete one or more blocks from the block chain and to adapt the block chain to the change caused by the deletion.

16 Claims, 3 Drawing Sheets

Figure 1:
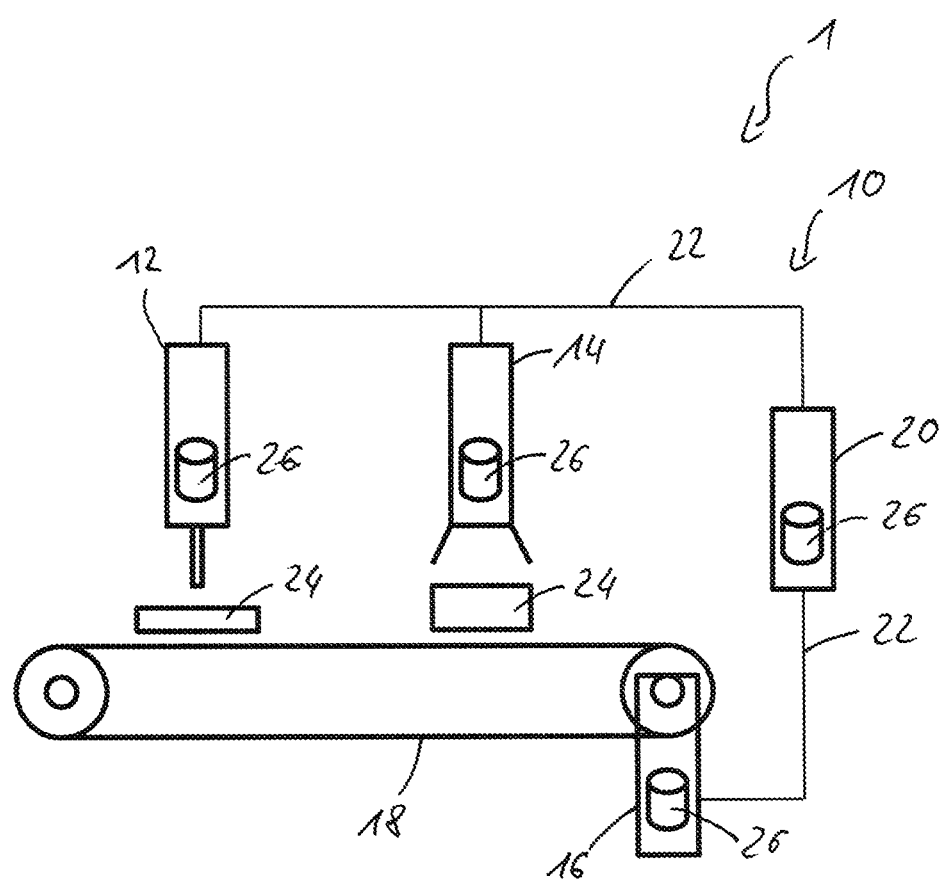

(58) Field of Classification Search
CPC ..... H04L 9/50; H04L 9/3239; H04L 63/0428; Y02P 90/02
See application file for complete search history.

(56) References Cited

U.S. PATENT DOCUMENTS

| | | | |
|---|---|---|---|
| 2003/0014536 A1* | 1/2003 | Christensen | H04L 67/12 709/200 |
| 2017/0323392 A1* | 11/2017 | Kasper | H04L 63/123 |
| 2019/0340269 A1* | 11/2019 | Biernat | H04L 9/50 |
| 2020/0036520 A1 | 1/2020 | Kilian | |
| 2020/0036729 A1* | 1/2020 | Maneval | G06F 21/64 |

FOREIGN PATENT DOCUMENTS

| | | |
|---|---|---|
| DE | 10 2016 118 613 A1 | 4/2018 |
| WO | WO 2018/059855 A1 | 4/2018 |
| WO | WO 2018/126837 A1 | 7/2018 |
| WO | WO 2019/024631 A1 | 2/2019 |
| WO | WO 2019/024780 A1 | 2/2019 |

\* cited by examiner

BLOCKCHAIN METHOD FOR CONTROLLING AN INDUSTRIAL PROCESS

The present invention relates to an industrial process controller that comprises at least three field devices coupled to one another by means of a data link. The field devices control and/or monitor an industrial process. In this respect, the field devices are configured to store a block chain, wherein the block chain comprises a plurality of blocks, and wherein the blocks store use data.

Field devices coupled to one another are typically used to control and/or to monitor more complex industrial processes. The field devices can, for example, be programmable logic controllers (PLCs), sensors, drives and the like. Workpieces can e.g. be produced, transported and/or sorted in the industrial process.

There is a need to protect industrial processes against manipulation and thus to ensure the process safety. The protection against manipulation additionally increases the reliability of the industrial process. However, the increased protective effect against manipulation does not have to have a negative effect on the performance of the industrial process or of the process controller.

It is therefore the object underlying the invention to provide an industrial process controller that provides an increased protection against manipulation and thereby has a high reliability, wherein the high reliability is implemented with little effort.

This object is satisfied by an industrial process controller in accordance with claim 1.

In accordance with the invention, the industrial process controller is characterized in that the field devices of the process controller are configured to delete one or more blocks from the block chain and to adapt the block chain to the change caused by the deletion, i.e. to adapt the block chain to the change caused by the deletion.

The invention is based on the recognition that an increase in the data security and a protection against a manipulation of the data of the individual field devices is possible through a block chain that is operated by the field devices of the process controller. However, the operation of a block chain is typically associated with a high effort and the memory space required for the block chain furthermore increases continuously the more data are stored in the block chain. In the case of field devices, the computing capacity and the memory space are not available to an arbitrary degree; for example, in particular low-cost field devices frequently only have a storage capacity of e.g. 128 megabytes. In accordance with the invention, it has therefore proven to be advantageous if blocks can be deleted from the block chain so that the block chain can also be permanently stored on the small available memory space of field devices.

The deletion of a block from a block chain is typically not provided for block chains. For this reason, the (remaining) block chain has to be adapted to the change caused by the deletion. The adaptation can in turn be performed by the field devices themselves as will be described in more detail later.

In accordance with the invention, the increased data security and the protection against manipulation is thus combined with the possibility of also implementing the block chain on simple field devices. The increased data security is ensured in that the use data are not only stored in a single field device but—due to the block chain—are stored in a large number of field devices, whereby an external storage can also be omitted.

More precisely, the same block chain is present on the field devices of the process controller. The field devices in this respect form nodes of the block chain. The block chain is a mechanism for a decentralized storage of use data that is managed as a distributed register (i.e. as a so-called "distributed ledger"). Each field device stores its own copy of the block chain and updates it. Changes to the block chain by a field device are communicated to the other field devices via the data link.

The block chain itself comprises a chained sequence of (data) blocks, wherein new blocks can be added by the field devices in the operation of the process controller. The deletion of one or more blocks of the block chain is (initially) likewise performed by at least one or more field devices.

At least 51% of the field devices (i.e. of the network participants) have to agree with the addition and/or deletion of a block. In this way, the integrity of the block chain is ensured and attacks such as manipulated or inadmissibly deleted data are prevented (e.g. if a participant wants to delete all the data).

51% of the field devices can also mean that more than half of the field devices agree.

The new block has to be recalculated (i.e. created) on the addition or creation of a block. In the calculation, a checksum or a hash value (see below) can be calculated that is based on data from the new block. In addition, a reference to the previous block can be integrated into the new block during the calculation. Subsequent changes to the (new) block can be recognized by the checksum.

The field devices are preferably separate units that cooperate via the data link to control and/or to monitor the industrial process. The number of field devices, i.e. the number of nodes of the block chain, is in particular constant. This means that the block chain does not have to be configured for the reception of additional nodes, which further simplifies the implementation of the block chain. Alternatively, new participants can also be added; however, since the number of participants added is usually small and the addition rather represents the exception, the effects on the simplicity of the implementation are rather marginal.

A field device can in particular be replaced, e.g. by a newer model. However, the number of field devices hereby remains the same.

The field devices can communicate with one another via the data link in order, for example, to reach a consensus on the addition of a new block or on the deletion of a block. The data link can simultaneously also be used for the monitoring and/or controlling of the industrial process. The data link can, for example, be a field bus, e.g. Sercos III, EtherCat, EIP and the like.

Advantageous further developments of the invention are described in the description, in the dependent claims, and in the drawings.

In accordance with a first embodiment, the field devices are configured to store one or more of the following categories of use data in the block chain:
- events, for example, changes of hardware, software and/or firmware of the field devices and/or errors;
- data that relate to the industrial process;
- configurations of the field devices; and
- data input by a user.

The use data to be stored can be transmitted to the field devices, in particular to all the field devices, via the data link. For example, the change of the firmware of one field device can be communicated to all the other field devices, whereupon all the field devices then store the firmware change in the block chain.

Which changes of hardware, software and/or firmware are made to the field devices can therefore in particular be stored in the block chain. In this way, it can later be traced whether a field device was e.g. physically replaced or whether changes were made to the software or firmware. This enables the recognition of manipulations or changes that are often easily possible with field devices since field devices typically only have small protection measures against changes.

In addition, it is also possible to trace changes that were not at all deliberately made by a user and that were e.g. made to the field devices by a programming tool or external maintenance software.

Log-on processes of users at the field devices can also be stored in the block chain. It is likewise possible to store errors in the block chain that are reported by the field devices. When and where interventions, for example into a sequence program (i.e. software), were made by which user can be traced by means of the block chain in this manner. Changes by an attacker can thus be detected, wherein it is made almost impossible for the attacker to cover his tracks since he would then have to access at least 51% of the field devices and accordingly adapt the block chain there. The process reliability is hereby considerably increased, wherein this, as shown herein, is possible with little effort.

In addition, the block chain can also be used to store data that relate to the industrial process. For example, production data such as formulas (G-Code), CNC sequences, doses in the pharmaceutical industry, production parameters and the like can be stored. A configuration across devices can hereby be made possible. It is also possible to provide a data interface to a user in order to store any desired data as use data in the block chain. Finally, a configuration of parameters for so-called "safety" field devices can, for example, also be stored in the block chain. Such field devices can, for example, satisfy the requirements in accordance with a "Safety Integrity Level" (SIL), for example, in accordance with SIL2 or SIL3.

In accordance with an embodiment, the field devices are configured to perform a recalculation of at least some of the blocks remaining after the deletion, with the recalculation preferably taking place before the (actual) deletion. Alternatively, the recalculation can also be performed after the deletion. Due to the recalculation, the remaining block chain can be adapted to the change caused by the deletion. For this purpose, the above-described processes can accordingly be applied to the remaining blocks on the creation of a new block. The use data in the blocks of the remaining block chain can remain unchanged on the recalculation, wherein the information required for the chaining of the blocks (i.e. the checksum or the hash value, see below) can, for example, be determined again on the recalculation.

In accordance with a further embodiment, the blocks of the block chain are linked and have a sequence. The chain link between two blocks in particular comprises a checksum, wherein the checksum is recalculated on the recalculation of the blocks. The chaining of the blocks therefore, for example, takes place in that a block stores the checksum of the previous block and a unique sequence of the blocks is defined in this manner. A pushing between of blocks and a changing of the previous block are prevented by the checksum. The checksum is preferably a part of the respective block and thereby has a direct effect on subsequent blocks. The checksum can also be designated as a checksum or as a check value and can, for example, be created by means of the CRC algorithm ("cyclic redundancy check"), in particular by means of CRC-32. The checksums can each be completely recalculated on the recalculation of the blocks.

In accordance with a further embodiment, the checksum of a respective block comprises a hash value relating to at least some of the use data of the block. Alternatively, the hash value can also, for example, be formed via a header of the block. The hash value can, for example, be determined by means of a cryptographic hash function such as MD4, MD5, or SHA.

The calculation of the checksum or of the hash value for a block and the agreement of at least 51% of the field devices can in particular be the only mandatory requirements (in addition to the presence of use data for the block) in order to add a new block to the block chain. The concept of "Proof of Work", which is frequently used in block chains and which requires a high computing power and a high energy input, is thus not applied. Instead, the simple determination of the hash value makes it possible to add new blocks to the block chain even with the low computing power available on field devices. The addition of new blocks thus does not impair or only minimally impairs the control of the industrial process.

In accordance with a further embodiment, the field devices are configured to perform the deletion in order to keep the memory space required for the block chain below a predetermined limit value. The predetermined limit value can in particular indicate the memory space per field device that is reserved for the block chain. The predetermined limit value can, for example, be 2, 5, 10, or 20 megabytes. The predetermined limit value and thus the memory space for the block chain are in particular the same on each of the field devices.

If a new block is now to be created for the block chain, it can then be checked whether the provided memory space ("quota") for the block chain is exceeded by the new block. If this is the case, older blocks are deleted, in particular after the creation of the new block. Before, with, or after the deletion, the checksum of the remaining blocks is in each case recalculated for them (as already mentioned) and the recalculated checksum is stored in the respective following block. The consistency of the block chain is ensured by the recalculation of the checksums and the storage of the new checksum in the respective following block.

Since only the recalculation of the checksums is necessary to maintain the consistency of the block chain after the deletion of blocks and the checksums can be determined with a small computing effort, this calculation can be performed without problems on the field devices. Each field device of the process controller in particular performs this calculation independently of one another.

One or more blocks can be simultaneously deleted on the deletion of blocks.

Generally speaking, the deletion of blocks can take place in response to a triggering event. The deletion of blocks can take place repeatedly, cyclically, and/or periodically (e.g. daily).

In accordance with an embodiment, the block chain is stored on a CF card or on an SD card. The memory space on such a card can, for example, amount to 128, 256, or 512 megabytes. The software and/or the device data of the respective field device can additionally be stored on the memory card. The total memory space of the field devices can in particular be limited to 128, 256, or 512 megabytes in each case.

In accordance with a further embodiment, the block chain comprises a genesis block, wherein the field devices are configured to leave the genesis block unchanged and/or to delete the respective oldest block or blocks on the deletion of blocks. The oldest block (apart from the genesis block) includes a respective reference to the genesis block.

The genesis block is the origin of the block chain. The genesis block is the only block that does not comprise a reference (e.g. by means of a hash value) to a previous block. The genesis block is preferably not deleted and is accordingly always retained.

Due to the deletion of the oldest blocks, a kind of ring buffer or ring memory is created that uses the memory space of the block chain. Since mainly the most recent use data are of interest for tracking or recognizing manipulation and thus for the data security, the older blocks and thus older use data can be deleted. The respective newest genesis block and/or the genesis block is/are preferably never deleted.

In accordance with a further embodiment, the field devices are configured to create new blocks of the block chain, in particular periodically, in a recurring manner, and/or on the presence of at least a predetermined volume of new use data. Each individual field device can therefore be able to create a new block. Use data are stored for the new block and a hash value or checksum is then created by the field device. Accordingly, a central unit is not necessary for the creation of a new block; a decentralized creation of new blocks rather takes place. This also applies to the deletion of blocks that can be triggered by any field device.

Several kilobytes of use data can in particular be stored in each block, e.g. up to 128 kilobytes, 256 kilobytes, or 512 kilobytes. Accordingly, a new block can be created if 128 kilobytes, 256 kilobytes, or 512 kilobytes of new use data are present. Prior to that, the use data can be buffered in at least one field device.

As soon as a change of the block chain occurs, whether by adding or deleting blocks, a communication of the field devices can take place by means of the data link to communicate the changes at the block chain to the other field devices. In this way, the block chain, in each case in its current form, is preferably present in an identical manner on all the field devices. If there is disagreement between the field devices about the block chain, a change to the block chain is considered as accepted if at least 51% of the field devices agree to a change.

The block chain in particular stores information or use data of all the field devices participating in the block chain so that the use data of all the other field devices are present in each field device.

In accordance with a further embodiment, deleted blocks are stored, in particular are only stored, in a central unit and/or in a single field device. In this way, the deleted blocks can later be used for a tracking. The central unit can be a part of the process controller and can be coupled to the field devices via the data link. The central unit can in particular have a much larger memory space than the respective field devices. The only field device that stores the deleted blocks can in particular be a field device having a large memory space (e.g. more than 1 GB).

In accordance with a further embodiment, the field devices are configured to establish a time synchronization with one another, in particular via the data link. Due to the data communication of the field devices with one another that is anyway necessary for the block chain, a time synchronization among the field devices can simultaneously be provided. This reduces user interventions and shortens the provision time for the process controller.

The invention additionally relates to a method of increasing the reliability of an industrial process controller that comprises at least three field devices coupled to one another by means of a data link, with the field devices controlling and/or monitoring an industrial process, wherein the field devices store a block chain, wherein the block chain comprises a plurality of blocks, and wherein the blocks store use data. The method is characterized in that one or more blocks are deleted from the block chain and the block chain is adapted to the change caused by the deletion.

Finally, the invention also relates to a field device for an industrial process controller, wherein the field device is configured to control and/or to monitor an industrial process, wherein the field device is further adapted to communicate by means of a data link and to store a block chain, wherein the block chain comprises a plurality of blocks, and wherein the blocks store use data. The field device is configured to delete one or more blocks from the block chain and to adapt the block chain to the change caused by the deletion.

The statements on the process controller in accordance with the invention accordingly apply to the method in accordance with the invention and to the field device in accordance with the invention. This in particular applies to advantages and embodiments.

Figure 2A:
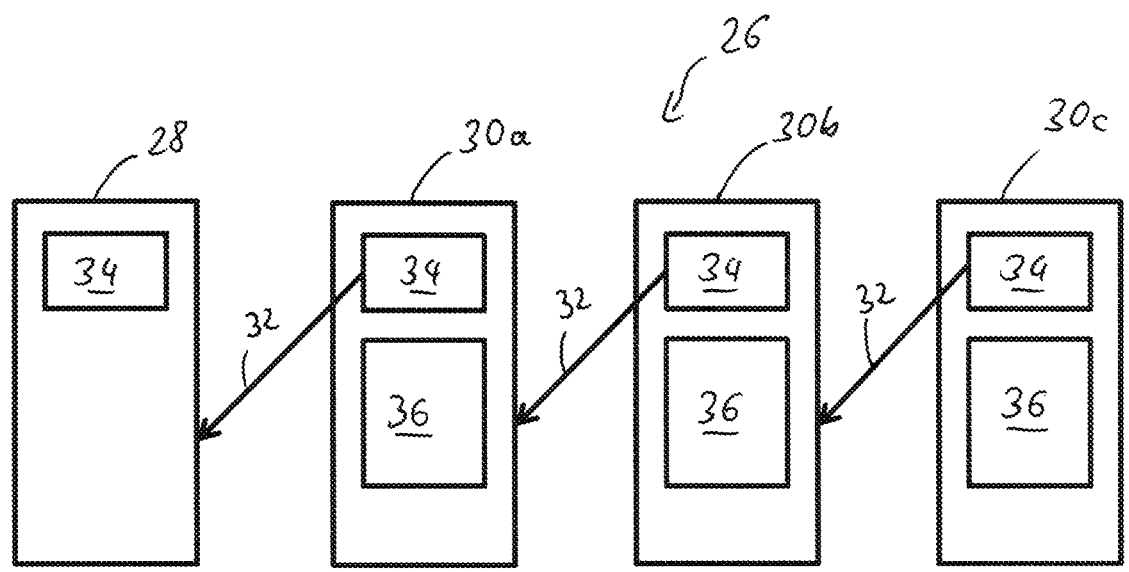
Figure 2B:
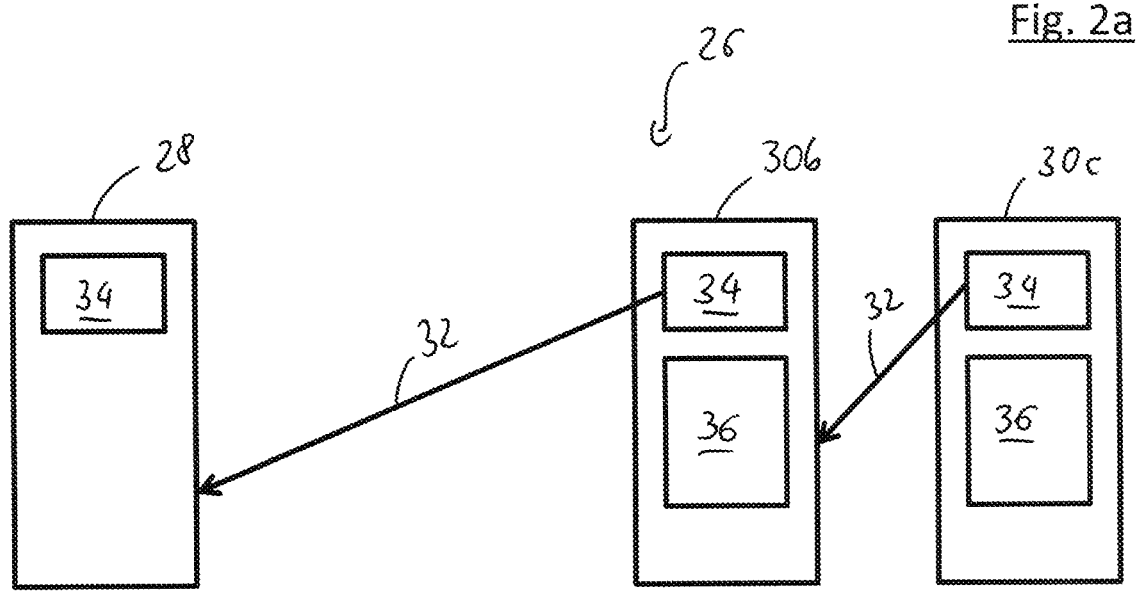

The invention will be described purely by way of example with reference to the drawings in the following. There are shown:

FIG. 1 an industrial process that is controlled by a process controller;

FIGS. 2a and 2b the deletion of a block from a block chain; and

Figure 3:
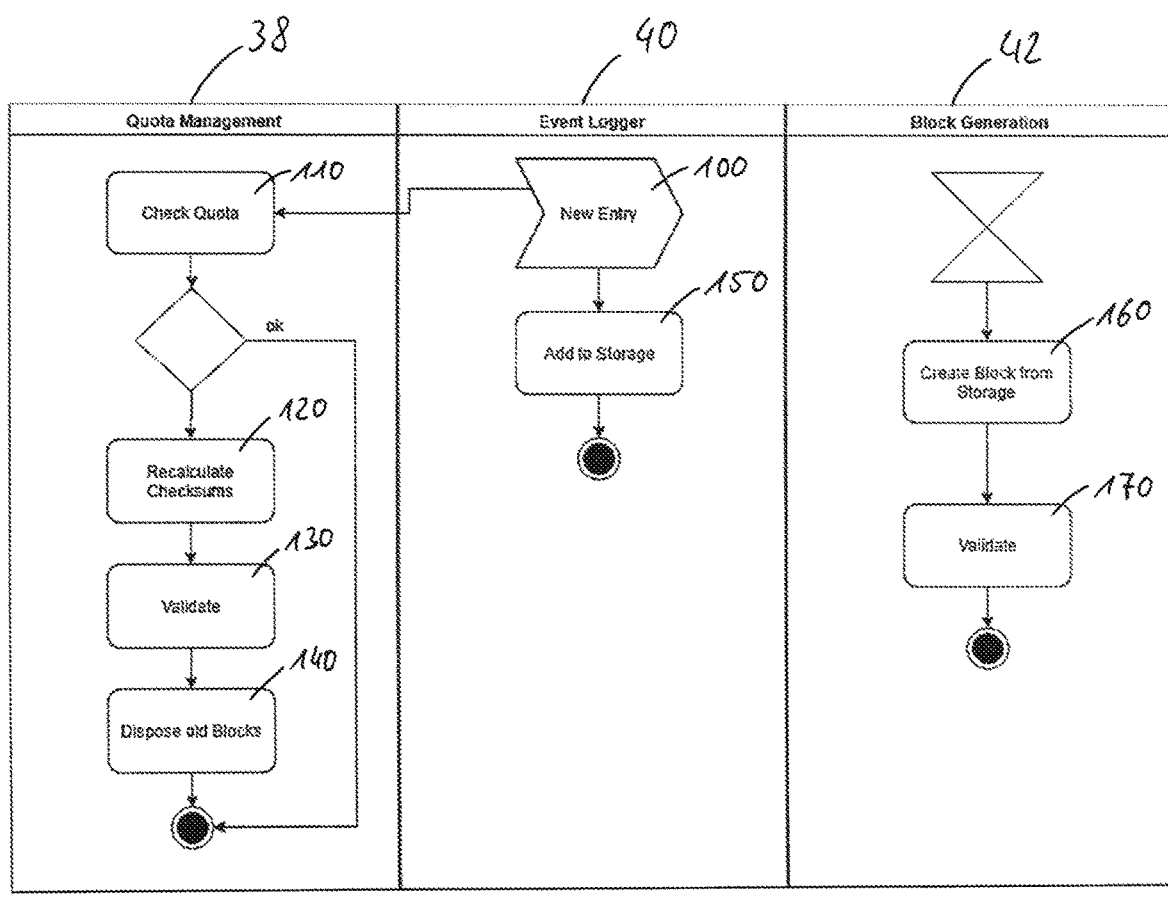

FIG. 3 the sequences on the deletion and addition of a block.

FIG. 1 shows an industrial process 1 that is controlled and monitored by means of an industrial process controller 10. The process controller 10 comprises a first field device (drive) in the form of a milling cutter 12; a second field device in the form of a depth sensor 14; a third field device configured as the drive 16 of a conveyor belt 18; and a fourth field device that is a programmable logic controller (PLC) 20. The field devices 12, 14, 16, 20 are coupled to one another by means of data links 22. The field devices 12, 14, 16, 20 cooperate to process workpieces 24 transported on the conveyor belt 18.

A block chain 26 is stored in each of the field devices 12, 14, 16, 20. More precisely, each field device 12, 14, 16, 20 stores a copy of the same block chain 26. The block chain 26 is kept consistent on the field devices 12, 14, 16, 20 via the data links 22.

The block chain 26 comprises blocks as shown in more detail in FIGS. 2a and 2b. The block chain 26 comprises a genesis block 28 and a plurality of further blocks 30, wherein three further blocks 30a, 30b and 30c are shown in FIG. 2a. Each of the further blocks 30 comprises a reference 32 to the previous block 30 or 28, with the reference in FIG. 2 being represented by a respective arrow. The reference 32 comprises a hash value 34 relating to use data 36 and to the further data of the previous block 28, 30.

If the block 30a is now to be deleted, the references 32 and thus the hash values 34 are recalculated by the field devices 12, 14, 16, 20. The block 30b then no longer stores the hash value 34 for the block 30a, but now stores the hash value of the genesis block 28. The hash value 34 now also has to be recalculated for the block 30c since the hash value 34, for example, relates to the total block 30b that has now also changed in the block 30b due to the changed predecessor in the form of the genesis block 28.

The size of the block chain 26 can be limited by the deletion of the block 30a.

FIG. 3 shows three modules that can be kept available in each of the field devices 12, 14, 16, 20 and that can be executed there by a respective processing device (not shown) of the field device 12, 14, 16, 20. The field devices 12, 14, 16, 20 comprise a deletion module 38; a log module 40; and a creation module 42.

The deletion module 38 serves for the deletion of the blocks 30, whereas the creation module 42 creates new blocks 30. The log module 40 logs events in the field devices 12, 14, 16, 20. If such an event occurs, a method step 100 is performed by the log module 40 and indicates that a new entry into the block chain 26 is desired. This has the result that, in the method step 110, a check is made by the deletion module 38 as to whether sufficient memory space is still available for the block chain 26. If this is not the case, the blocks 30 to be deleted are defined in the step 120 and the hash values 34 of the remaining blocks 30 are recalculated. The recalculated hash values 34 are then checked in the step 130 and the selected blocks 30 are deleted in the step 140.

If sufficient memory space is present, the steps 120 to 140 are thus skipped.

Since a new block 30 can now be created, the creation module 42 is activated by the step 150 and creates a new block 30 in the step 160 from the already available use data 36 and validates the new block 30 in the step 170.

The block chain 26 modified in this way is then transferred to the remaining field devices 12, 14, 16, 20, is checked there, and is stored in the other field devices 12, 14, 16, 20 after a successful check.

It can be recognized that the steps necessary for maintaining the block chain 26 over a long period of time can be performed with little effort and thus also by inexpensive hardware. In this way, the advantages of the manipulation security, data security and increased reliability are provided for process controllers having field devices.

REFERENCE NUMERAL LIST

1 industrial process
10 process controller
12 milling cutter
14 depth sensor
16 drive
18 conveyor belt
20 PLC
22 data link
24 workpiece
26 block chain
28 genesis block
30 block
32 reference
34 hash value
36 use data
38 deletion module
42 log module
42 creation module
100 new entry
110 check memory space
120 recalculate hash value
130 check hash value
140 delete blocks
150 activate creation module
160 create block
170 validate new block

The invention claimed is:

1. An industrial process controller comprising:
at least three field devices coupled to one another by means of a data link, with the field devices controlling and/or monitoring an industrial process,
the field devices being configured to store a block chain, wherein the block chain comprises a plurality of blocks, and wherein the blocks store use data, and
the field devices being configured to delete one or more blocks from the block chain and to adapt the block chain to the change caused by the deletion,
wherein the field devices are configured to perform a recalculation of at least some of the blocks remaining after the deletion.

2. The process controller in accordance with claim 1, wherein the field devices are configured to store one or more of the following categories of use data in the block chain:
events;
data that relate to the industrial process;
configurations of the field devices; and
data input by a user.

3. The process controller in accordance with claim 2, wherein the events comprise at least one of the following: changes of hardware, software, firmware and errors.

4. The process controller in accordance with claim 1, wherein the recalculation takes place before the deletion.

5. The process controller in accordance with claim 1, wherein the blocks of the block chain are linked and have a sequence, wherein the chain link between two blocks comprises a checksum, and wherein the checksums are recalculated on the recalculation of the blocks.

6. The process controller in accordance with claim 5, wherein the checksum of a respective block comprises a hash value relating to at least some of the use data of the block.

7. The process controller in accordance with claim 1, wherein the field devices are configured to perform the deletion in order to keep the memory space required for the block chain below a predetermined limit value.

8. The process controller in accordance with claim 1, wherein the block chain comprises a genesis block, and wherein the field devices are configured to leave the genesis block unchanged and/or to delete the respective oldest block or blocks on the deletion of blocks.

9. The process controller in accordance with claim 1, wherein the field devices are configured to create new blocks of the block chain.

10. The process controller in accordance with claim 1, wherein the field devices are configured to create new blocks of the block chain periodically, in a recurring manner, and/or on the presence of at least a predetermined volume of new use data.

11. The process controller in accordance with claim 1, wherein deleted blocks are stored in a central unit and/or in a single field device.

12. The process controller in accordance with claim 1, wherein deleted blocks are only stored, in a central unit and/or in a single field device.

13. The process controller in accordance with claim 1, wherein the field devices are configured to establish a time synchronization with one another.

14. The process controller in accordance with claim 1, wherein the field devices are configured to establish a time synchronization with one another via the data link.

15. A method of increasing the reliability of an industrial process controller that comprises at least three field devices coupled to one another by means of a data link, with the field devices controlling and/or monitoring an industrial process,
    wherein the field devices store a block chain, wherein the block chain comprises a plurality of blocks, wherein the blocks store use data,
    and wherein one or more blocks are deleted from the block chain and the block chain is adapted to the change caused by the deletion,
    wherein a recalculation of at least some of the blocks remaining is performed after the deletion.

16. A field device for an industrial process controller, wherein the field device is configured to control and/or to monitor an industrial process, wherein the field device is further adapted to communicate by means of a data link and to store a block chain, wherein the block chain comprises a plurality of blocks, and wherein the blocks store use data,
    wherein the field device is configured to delete one or more blocks from the block chain and to adapt the block chain to the change caused by the deletion, and to perform a recalculation of at least some of the blocks remaining after the deletion.

\* \* \* \* \*